US008667179B2

(12) United States Patent
Miller et al.

(10) Patent No.: US 8,667,179 B2
(45) Date of Patent: Mar. 4, 2014

(54) DYNAMIC UTILIZATION OF CONDENSING METADATA

(75) Inventors: Quentin S. C. Miller, Sammamish, WA (US); David E. W. Mercer, Bothell, WA (US); John J. Ostlund, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 2098 days.

(21) Appl. No.: 11/118,727

(22) Filed: Apr. 29, 2005

(65) Prior Publication Data

US 2006/0246879 A1    Nov. 2, 2006

(51) Int. Cl.
*G06F 15/16* (2006.01)
*H04L 12/28* (2006.01)

(52) U.S. Cl.
USPC .......................... 709/246; 370/394; 709/247

(58) Field of Classification Search
USPC ........... 709/246, 247; 455/72, 414.1; 370/394
See application file for complete search history.

(56) References Cited

U.S. PATENT DOCUMENTS

| 6,883,137 | B1* | 4/2005 | Girardot et al. | 715/242 |
|---|---|---|---|---|
| 7,343,377 | B1* | 3/2008 | van Opdorp | 1/1 |
| 2003/0154308 | A1* | 8/2003 | Tang et al. | 709/247 |
| 2004/0028049 | A1* | 2/2004 | Wan | 370/394 |
| 2004/0111427 | A1* | 6/2004 | Gu | 707/101 |
| 2004/0139393 | A1* | 7/2004 | Heuer et al. | 715/513 |
| 2004/0215830 | A1* | 10/2004 | Shenfield | 709/246 |

* cited by examiner

*Primary Examiner* — David X Yi
(74) *Attorney, Agent, or Firm* — Lee & Hayes, PLLC (57) ABSTRACT

Dynamic utilization of condensing metadata is enabled by condensing information being communicated to/from a mobile device. The communication exchange occurs between a mobile device and an internet service, and it involves a mobile internet service proxy. The information is condensed responsive to condensing metadata and uncondensed using the condensing metadata. In an example embodiment, condensing metadata comprises encoding metadata for tags and compression metadata for other data. In a first described implementation, a mobile internet service proxy effectuates a static installation of condensing metadata to the mobile device from the internet service. In a second described implementation, the internet service lacks condensing metadata. The mobile internet service proxy therefore retrieves the schema defining the relevant information and dynamically generates condensing metadata. This dynamically-generated condensing metadata is copied to the mobile device so that condensed data may be communicated at least between the mobile device and the mobile internet service proxy.

18 Claims, 8 Drawing Sheets

DYNAMIC UTILIZATION OF CONDENSING METADATA

TECHNICAL FIELD

This disclosure relates in general to accessing internet services with a mobile device and in particular, by way of example but not limitation, to dynamically utilizing condensing metadata when accessing internet services with a mobile device.

BACKGROUND

Communication networks are inherently bandwidth limited. This is especially true for wireless communication networks that operate using a finite, and often governmentally-limited, amount of the electromagnetic spectrum. The capacity of wireless communication networks has been effectively expanded by implementing cellular wireless networks. Cellular wireless networks divide an area geographically into cells to enable the reuse of spectrum resources in different cells.

The capacity of wireless communication has been expanded in other manners as well. For example, digital packetization and time division has enabled a given spectrum band to be more efficiently used from a temporal perspective by enabling multiple mobile devices to use the same spectrum in different time slots. Code division spread spectrum technology has enabled temporally-simultaneous spectrum sharing using mobile devices that employ different codes. Other approaches have also been utilized to increase the efficiency of spectrum use.

These various approaches have been responsible in part for the proliferation of different wireless standards and communication protocols. The different standards and communication protocols have created a very heterogeneous wireless environment. Furthermore, in addition to different standards being developed and adopted around the world, multiple generations of wireless standards and protocols are currently in use. Moreover, there are different wireless service providers and multiple mobile device manufacturers that add to the diversity of existing wireless communication parameters that can impact internet-related communications in the context of wireless networks.

Thus, two important facets of wireless communication are: (i) bandwidth limitations are a relevant factor to consider when interfacing with wireless networks and (ii) many different wireless standards and protocols may be encountered during wireless network communications. Unfortunately, not only is the former partly responsible for begetting the latter, but the latter exacerbates attempts to mitigate the effects of the former. Accordingly, there is a need for schemes, mechanisms, techniques, etc. that can facilitate communication bandwidth reduction with respect to wireless networks while being capable of accommodating various wireless network standards and communication protocols.

SUMMARY

Dynamic utilization of condensing metadata is enabled by condensing information being communicated to/from a mobile device. The overall communication exchange occurs between a mobile device and an internet service, but it can also involve a mobile internet service proxy. The information being communicated is condensed responsive to condensing metadata and uncondensed using the condensing metadata. In an example embodiment, condensing metadata comprises encoding metadata for tag portions of the information and compression metadata for other data portions of the information.

In a first example described implementation, a mobile internet service proxy effectuates a static installation of condensing metadata to the mobile device from the internet service. In a second example described implementation, the internet service lacks condensing metadata. The mobile internet service proxy therefore retrieves from the internet service the schema defining the organization, structure, formatting, etc. of the information. The mobile internet service proxy dynamically generates condensing metadata based on the schema. This dynamically-generated condensing metadata is copied to the mobile device so that condensed data may be communicated at least between the mobile device and the mobile internet service proxy along the communication path toward/from the internet service.

Other method, system, approach, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

As described generally herein above, there are inherent constraints imposed by wireless wide area networks (WANs) (e.g., GPRS, EDGE, 1xRTT, 1xEVDO, UMTS, etc.) and mobile devices that operate in conjunction with them. Consequently, it can be extremely challenging to deliver rich web services to embedded and other mobile applications without having a tight binding between the client and server deployments. This limits extensibility, reduces flexibility, and prevents rapid development of new services to meet market demands. To overcome these challenges, there is a need for schemes, mechanisms, techniques, etc. that not only efficiently compress internet service protocols, but that also enable service extensions to be seamlessly integrated into existing internet service protocols.

Current mobile devices interact with internet services by communicating tightly with a specific service provider to enable an internet service for use by the end user. One reason for the close coupling is that the client mobile device usually needs to understand the compression (if any) used by the service provider and any proprietary or other special extensions made by the service provider to the standard internet service protocols.

In an example described implementation, a mobile internet service proxy is employed. The mobile internet service proxy selectively interfaces with the client mobile device and then queries the internet service for the compression/decompression (or, more generally, condensation) technique of the extensible markup language (XML) or other formatting language type or internet protocol used by the internet service. The condensation technique is then used by the client mobile device to directly or by the mobile internet service proxy to dynamically perform condensation on behalf of the client mobile device. Specifically for the latter embodiment, the mobile internet service proxy copies the schema of the internet service, generates corresponding condensing metadata (e.g., encoding metadata and/or compression metadata), and communicates the condensing metadata to a mobile application at the client mobile device. The mobile application can then access the internet service through the mobile internet service proxy using a dynamically encoded and compressed internet service protocol.

To facilitate understanding, this description is separated into four sections in addition to this "Introduction" section. A first section references FIG. 1 and is entitled "Example Environments for Dynamic Utilization of Condensing Metadata". A second section references FIGS. 2-4 and is entitled "Example Static Installation Implementations for Dynamic Utilization of Condensing Metadata". A third section references FIGS. 5-7 and is entitled "Example Dynamic Generation Implementations for Dynamic Utilization of Condensing Metadata". There is also a fourth section that references FIG. 8 and is entitled "Example Operating Environment for Computer or Other Device".

Example Environments for Dynamic Utilization of Condensing Metadata

Figure 1:
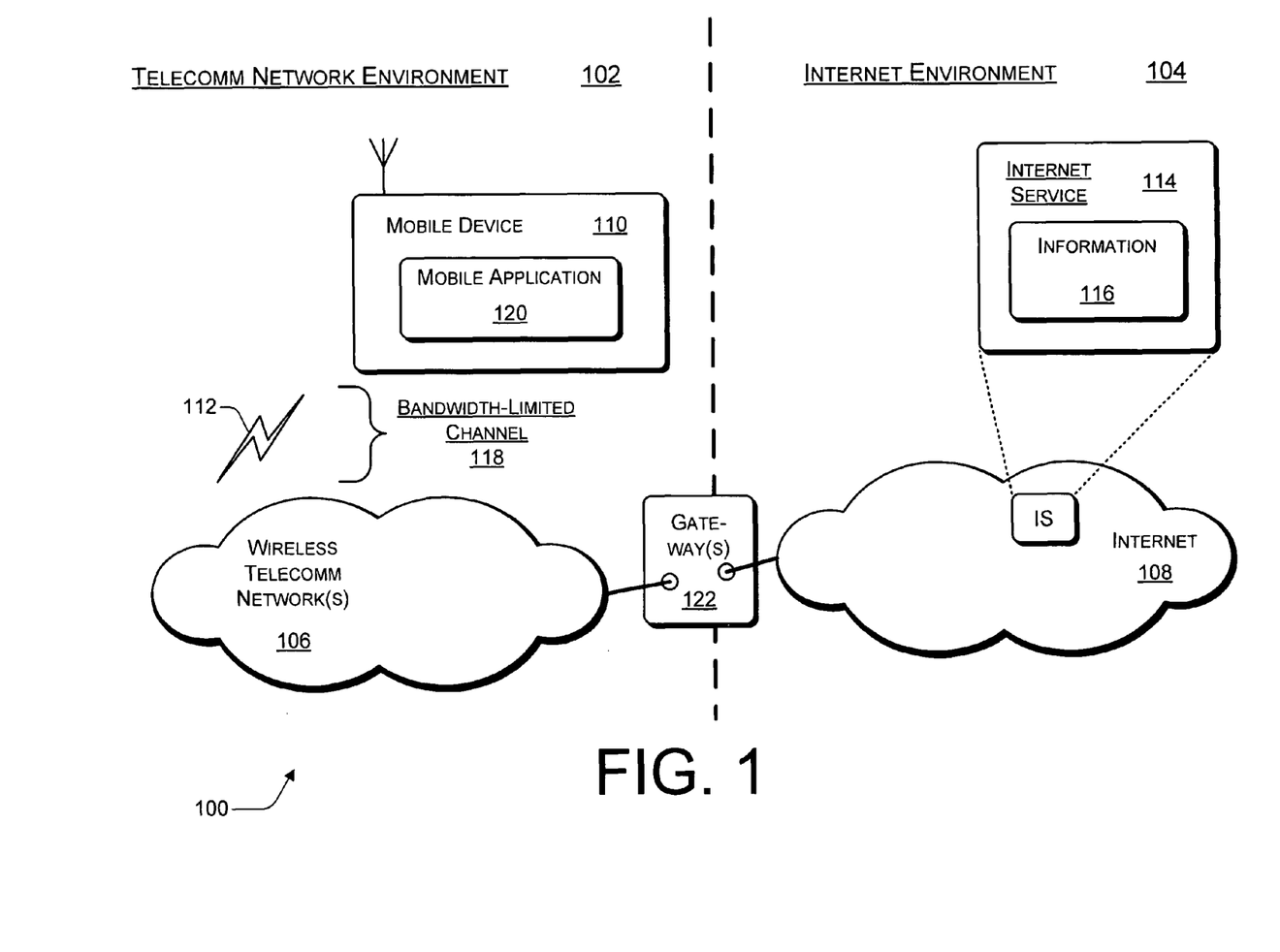
FIG. 1 is a block diagram of example environments in which dynamic utilization of condensing metadata may be implemented.

FIG. 1 is a block diagram of example environments 100 in which dynamic utilization of condensing metadata may be implemented. Environments 100 are bifurcated into a telecommunications network environment 102 and an internet environment 104. Telecommunications network environment 102 may be comprised of one or more mobile or wireless networks, public switched telephone networks (PSTNs), some combination thereof, and so forth. Internet environment 104 may be comprised of one or more of a local area network (LAN), a wide area network (WAN), the traditional Internet, a Wi-Fi network, some combination thereof, and so forth.

As illustrated, telecommunications network environment 102 is shown to include one or more wireless telecommunications networks 106. However, it may also include one or more wired telecommunications networks. Internet environment 104 is shown to include at least one internet 108. Wireless telecommunications network 106 can communicate with internet 108 via one or more gateways 122. A single gateway 122 can enable communication between wireless telecommunications network 106 and internet 108, or multiple gateways 122 may be employed. In either case, such gateway(s) 122 may be part of wireless telecommunications network 106, internet 108, both networks, or neither network from a technological and/or a service provider perspective.

In a described implementation, internet environment 104 includes an internet service (IS) 114 that is coupled to (including being a part of) internet 108. In a real-world setting, multiple such internet services 114 can be and most likely are coupled to internet 108. Internet service 114 may be any general internet service, such as personal computer-based applications, embedded applications, so-called web services, some combination thereof, and so forth. Internet service 114 enables access to information 116 in response to or as a result of some kind of request. Such requests include specific requests, transaction-related requests, generally inquiries, some combination thereof, and so forth.

Examples of internet services 114 include, but are not limited to: database accessing, scheduling information accessing, email sending/receiving, product/service ordering, web site information retrieval, game playing and online game data managing and organizing, social networking, data searching and retrieving, contact list managing, group membership managing, media metadata (e.g., music album information, movie production and cast information, etc.) managing and organizing, some combination thereof, and so forth. Examples of information 116 include, but are not limited to: information from a database entry, calendar appointment information, an email and/or an attachment of an email, invoice information, weather or news information, game information, social information (e.g., social networks), search engine information (e.g., indexed data, search history, etc.), contact information, group information, media metadata, data catalogues, some combination thereof, and so forth.

Telecommunications network environment 102 includes a mobile device 110 that is coupled to wireless telecommunications network 106 via a wireless communication link 112. In a real-world setting, multiple such mobile devices 110 can be and most likely are being supported by wireless telecommunications network 106. Mobile device 110 typically comprises a mobile telephone, a personal digital assistant (PDA), or another hand-held wireless device. Nevertheless, mobile device 110 may alternatively comprise any device having a wireless communication capability. Mobile device 110 includes a mobile application 120. Mobile application 120 is capable of enabling a user of mobile device 110 to access internet service 114.

The access of internet service 114 by mobile application 120 entails a communication flow from mobile device 110 to wireless telecommunications network 106 via wireless link 112 and from wireless telecommunications network 106 to internet 108 via at least one gateway 122. The communication flow also extends to internet service 114, which is coupled to internet 108.

Thus, the providing of internet service 114 to a user of mobile device 110 involves communications across wireless communications link 112. Unfortunately, because communications link 112 is wireless, it is a particularly bandwidth-limited channel 118. Accordingly, the bandwidth-limited channel 118 of wireless communication link 112 can be better utilized if internet services communications propagating thereon are condensed in order to reduce bandwidth consumption.

Figure 2:
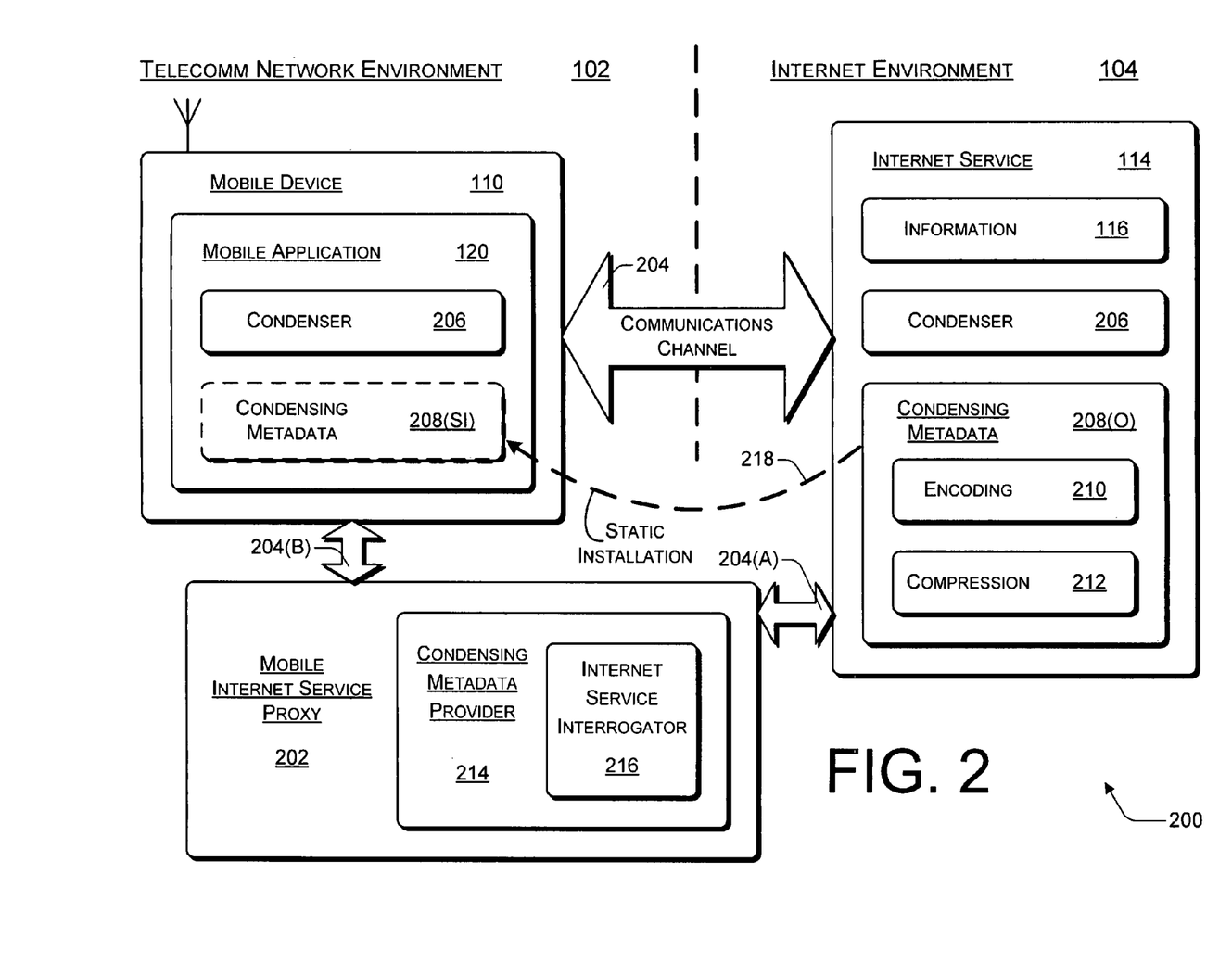
FIG. 2 is a block diagram illustrating an example mechanism for installation of static condensing metadata.

Example Static Installation Implementations for Dynamic Utilization of Condensing Metadata FIG. 2 is a block diagram illustrating an example mechanism 200 for installation of static condensing metadata. Telecommunications network environment 102 includes mobile device 110, and internet environment 104 includes internet service 114. Communication between mobile device 110 and internet service 114 is effectuated over a communications channel 204. Communications channel 204 can comprise a wireless communications link 112 (of FIG. 1), a wireless telecommunications network 106, a gateway 122, and an internet 108. However, communications channel 204 may alternatively be realized using different communication components.

As illustrated, example mechanism 200 also includes a mobile internet service proxy 202. In a described implementation, mobile internet service proxy 202 may be located anywhere along a communication path stretching between mobile device 110 and internet service 114 from wireless telecommunications network 106 to internet service 114. For example, mobile internet service proxy 202 may be located at a node operated by a telecommunications entity or an internet-related entity. The node may be for routing, for providing a gateway, for providing another service, dedicated to being a mobile internet service proxy, some combination thereof, and so forth. Additionally, the node may be located within wireless telecommunications network 106, internet 108, or both, or it may be distributed anywhere along the communications path.

Mobile device 110 includes mobile application 120. Mobile application 120 includes a condenser 206 that is capable of condensing (and uncondensing) communications, including communications received wirelessly via communications link 112. As is described further herein below, mobile application 120 may be shipped with mobile device 110 or subsequently downloaded and installed to mobile device 110. In either case, mobile application 120 may inherently include condenser 206 functionality or have a capability to utilize a condenser 206 after one has been loaded and installed. In the example used to describe mechanism 200, mobile application 120 initially lacks condensing metadata 208, as is indicated by the block formed from dashed lines.

Internet service 114 includes, in addition to information 116, a condenser 206 and condensing metadata 208. Specifically, internet service 114 includes original condensing metadata 208(O). In a described implementation, condensing metadata 208 includes encoding metadata 210 and compression metadata 212. However, condensing metadata 208 may alternatively be comprised of fewer or more and/or of different types of metadata. Typically, information 116 is organized, structured, and/or formatted in accordance with a schema (not explicitly shown in FIG. 2). The original of condensing metadata 208(O) can be derived fully or partially from the schema using a manual approach (e.g., by the developer), a programmatic approach (e.g., by development tools or similar), and so forth. Metadata 208(O) may be stored in the same file as the schema or in a separate file.

In operation generally, internet service 114 applies condenser 206 to condense information 116 responsive to condensing metadata 208(O). Specifically, but by way of example only, information 116 is condensed responsive to condensing metadata 208 (i) by encoding the (e.g., extensible markup language (XML)) tags of information 116 responsive to encoding metadata 210 and (ii) by compressing the associated element/attribute data of information 116 responsive to compression metadata 212. Information 116 may be condensed in other alternative manners, such as by compressing the entirety of information 116.

As illustrated, mobile internet service proxy 202 is capable of communicating with mobile device 110 via a communications channel 204(B) and with internet service 114 via a communications channel 204(A). These communication channels 204(A) and 204(B) are formed from the various communication components described herein above with reference to FIG. 1 in dependence on the location of mobile internet service proxy 202. For example, if mobile internet service proxy 202 is located within internet 108, then communications channel 204(B) may comprise wireless communications link 112, wireless telecommunications network 106, gateway 122, and part of internet 108. Communications channel 204(A) may thus comprise part of internet 108.

In a described implementation, mobile internet service proxy 202 includes a condensing metadata provider 214. Condensing metadata provider 214 includes an internet service interrogator 216. Internet service interrogator 216 is adapted to dynamically interrogate internet service 114 to determine if it has condensing metadata 208(O). Condensing metadata provider 214 is adapted to provide condensing metadata 208 to mobile application 120.

In operation, if internet service 114 is dynamically determined by internet service interrogator 216 to include original condensing metadata 208(O), then condensing metadata provider 214 is capable of having it statically installed at mobile device 110 as statically installed condensing metadata 208 (SI) as indicated by static installation arrow 218. The static installation of condensing metadata 208 may be effectuated by mobile internet service proxy 202 so as to occur directly between mobile device 110 and internet service 114. Alternatively, mobile internet service proxy 202 may first retrieve a copy of condensing metadata 208 from internet service 114 and then forward the copy of condensing metadata 208 to mobile device 110 to be installed for mobile application 120 as statically installed condensing metadata 208(SI).

Condenser 206 of mobile device 110 and/or internet service 114 may be versioned. Thus, condenser 206 may be capable of being dynamically replaced in order to support upgrade and/or new installation scenarios. The new condenser 206 in a general replacement scenario may be to change an existing condensing technology or to provide a new condensing technology. An example is described herein below with particular reference to FIG. 5.

Figure 3:
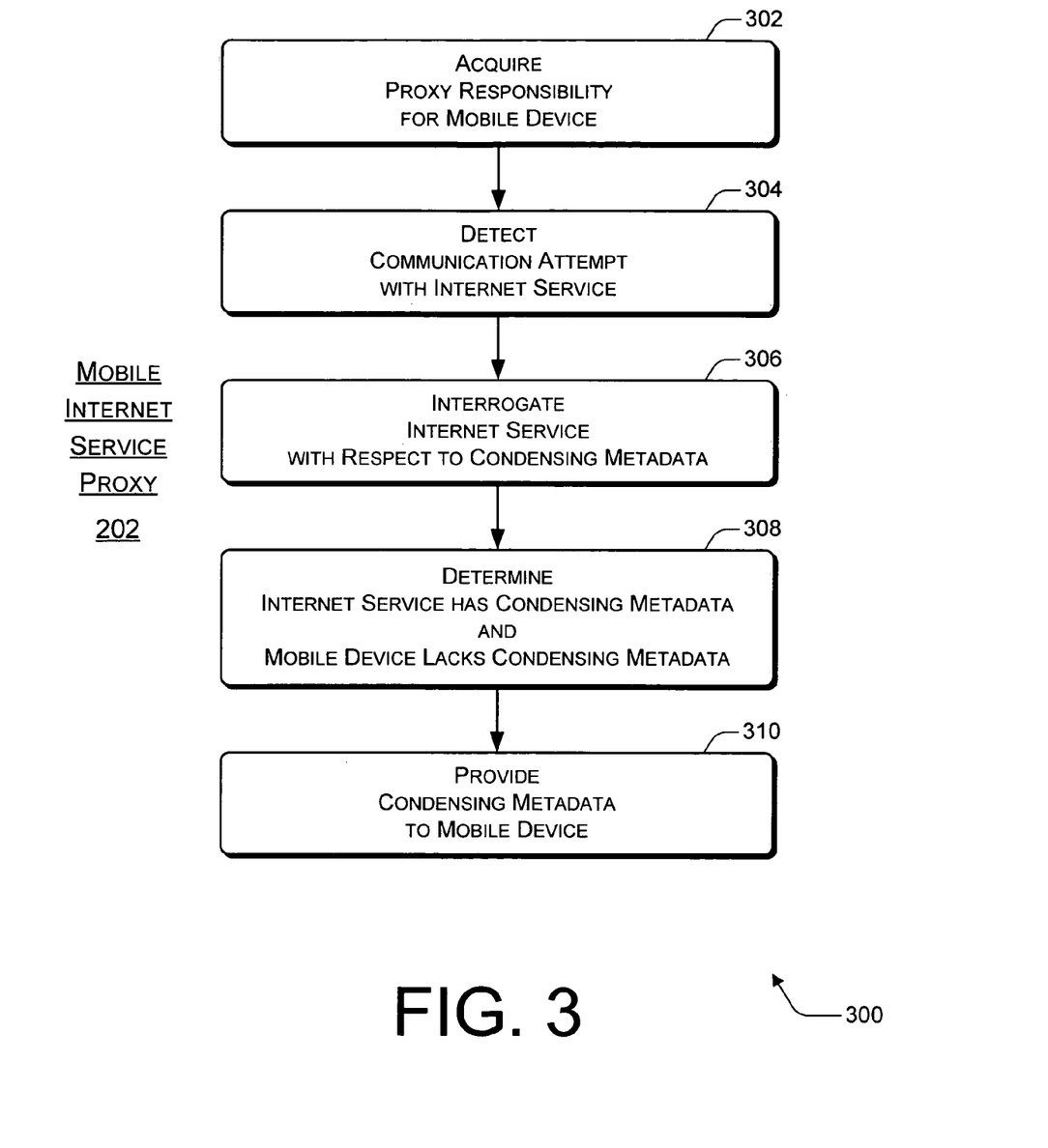
FIG. 3 is a flow diagram that illustrates an example of a method for dynamically installing static condensing metadata.

FIG. 3 is a flow diagram 300 that illustrates an example of a method for dynamically installing static condensing metadata. Flow diagram 300 includes five (5) blocks 302-310. Although the actions of flow diagram 300 may be performed in other environments and with a variety of hardware and software combinations, FIGS. 1 and 2 are used in particular to illustrate certain aspects and examples of the method. By way of example only, the actions of flow diagram 300 may be performed by a mobile internet service proxy 202.

At block 302, proxy responsibility for a mobile device is acquired. For example, proxy responsibility for mobile device 110 may be acquired by mobile internet service proxy 202. The acquisition may occur as a result of a mobile device request, an assignment by a telecommunications network provider, a prompting after receipt of an initial communication request at an internet service, some combination thereof, and so forth.

At block 304, a communication attempt with an internet service is detected. For example, mobile internet service proxy 202 may detect that mobile device 110 is attempting to communicate with internet service 114. The detection may occur because mobile internet service proxy 202 is monitoring outgoing communications from mobile device 110, because mobile device 110 is constrained to make internet-related requests through mobile internet service proxy 202, and so forth.

At block 306, the internet service is interrogated with respect to condensing metadata. For example, internet service interrogator 216 of mobile internet service proxy 202 may interrogate internet service 114 to determine if internet service 114 has condensing metadata 208. This interrogation may be general with regard to any condensing metadata 208 or specific with regard to condensing metadata 208 that is associated with requested information 116.

At block 308, it is determined that the internet service has condensing metadata and that the mobile device lacks such condensing metadata. For example, mobile internet service proxy 202 may determine that internet service 114 does have original condensing metadata 208(O) and that mobile application 120 of mobile device 110 lacks such condensing metadata 208. Mobile internet service proxy 202 may already be aware of which condensing metadata algorithms mobile device 110 includes, or mobile internet service proxy 202 may elect to interrogate mobile device 110 with respect to condensing metadata.

At block 310, condensing metadata is provided to the mobile device. For example, condensing metadata provider 214 of mobile internet service proxy 202 may provide condensing metadata 208 to mobile device 110 from internet service 114 for installation as statically-installed condensing metadata 208(SI). If mobile device 110 is also lacking condenser 206, mobile internet service proxy 202 may also provide condenser 206 to mobile application 120. Thereafter, mobile application 120 can engage in communications with internet service 114 that are condensed responsive to condensing metadata 208 and uncondensed using condensing metadata 208.

Figure 4:
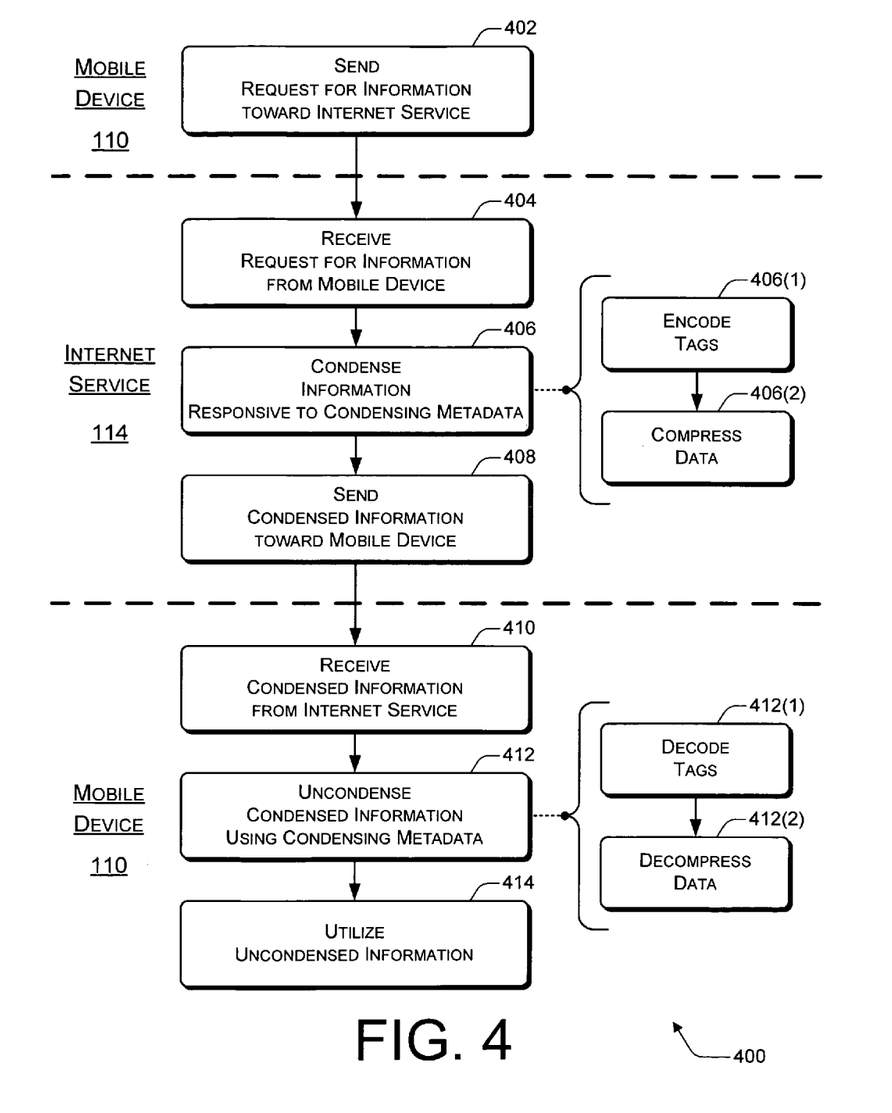
FIG. 4 is a flow diagram that illustrates an example of a method for bandwidth reduction by communicating condensed information.

FIG. 4 is a flow diagram 400 that illustrates an example of a method for bandwidth reduction by communicating condensed information. Flow diagram 400 includes seven (7) "primary" blocks 402-414 and four (4) "secondary" blocks 406(1), 406(2), 412(1), and 412(2). Although the actions of flow diagram 400 may be performed in other environments and with a variety of hardware and software combinations, FIGS. 1 and 2 are used in particular to illustrate certain aspects and examples of the method. By way of example only, the actions of blocks 402 and 410-414 may be performed by a mobile device 110 having statically-installed condensing metadata 208(SI), and the actions of blocks 404-408 may be performed by an internet service 114 having original condensing metadata 208(O).

At block 402, a request for information is sent toward an internet service by a mobile device. For example, mobile device 110 may send a request for information 116 to internet service 114 via communications channel 204 either directly or via mobile internet service proxy 202. After a mobile device 110 has statically-installed condensing metadata 208 (SI), it may optionally bypass mobile internet service proxy 202 and directly communicate with internet service 114.

At block 404, the request for information is received from the mobile device at the internet service. For example, internet service 114 may receive the request for information 116 from mobile device 110.

At block 406, the information is condensed responsive to condensing metadata. For example, internet service 114 may condense information 116 responsive to condensing metadata 208 by applying condenser 206. Blocks 406(1) and 406 (2) illustrate actions for an example implementation of the action(s) of block 406. At block 406(1), tags of the information are encoded. At block 406(2), other data of the information is compressed. For instance, tags of information 116 may be encoded responsive to encoding metadata 210, and data of information 116 may be compressed responsive to compression metadata 212.

At block 408, the condensed information is sent toward the mobile device. For example, internet service 114 may send a condensed version or format of information 116 toward mobile device 110.

At block 410, the condensed information is received from the internet service at the mobile device. For example, mobile device 110 may receive the condensed version of the requested information 116 from internet service 114.

At block 412, the condensed information is uncondensed using the condensing metadata. For example, mobile device 110 may uncondense the condensed version of information 116 using statically-installed condensing metadata 208(SI). Blocks 412(1) and 412(2) illustrate actions for an example implementation of the action(s) of block 412. At block 412 (1), encoded tags of the condensed information are decoded. At block 412(2), compressed data of the condensed information is decompressed. For instance, encoded tags of a condensed version of information 116 may be decoded using encoding metadata 210, and compressed data of a condensed version of information 116 may be decompressed using compression metadata 212.

At block 414, the uncondensed information is utilized. For example, mobile application 120 of mobile device 110 may utilize the requested information 116 by storing it, displaying it, manipulating it, some combination thereof, and so forth.

Figure 5:
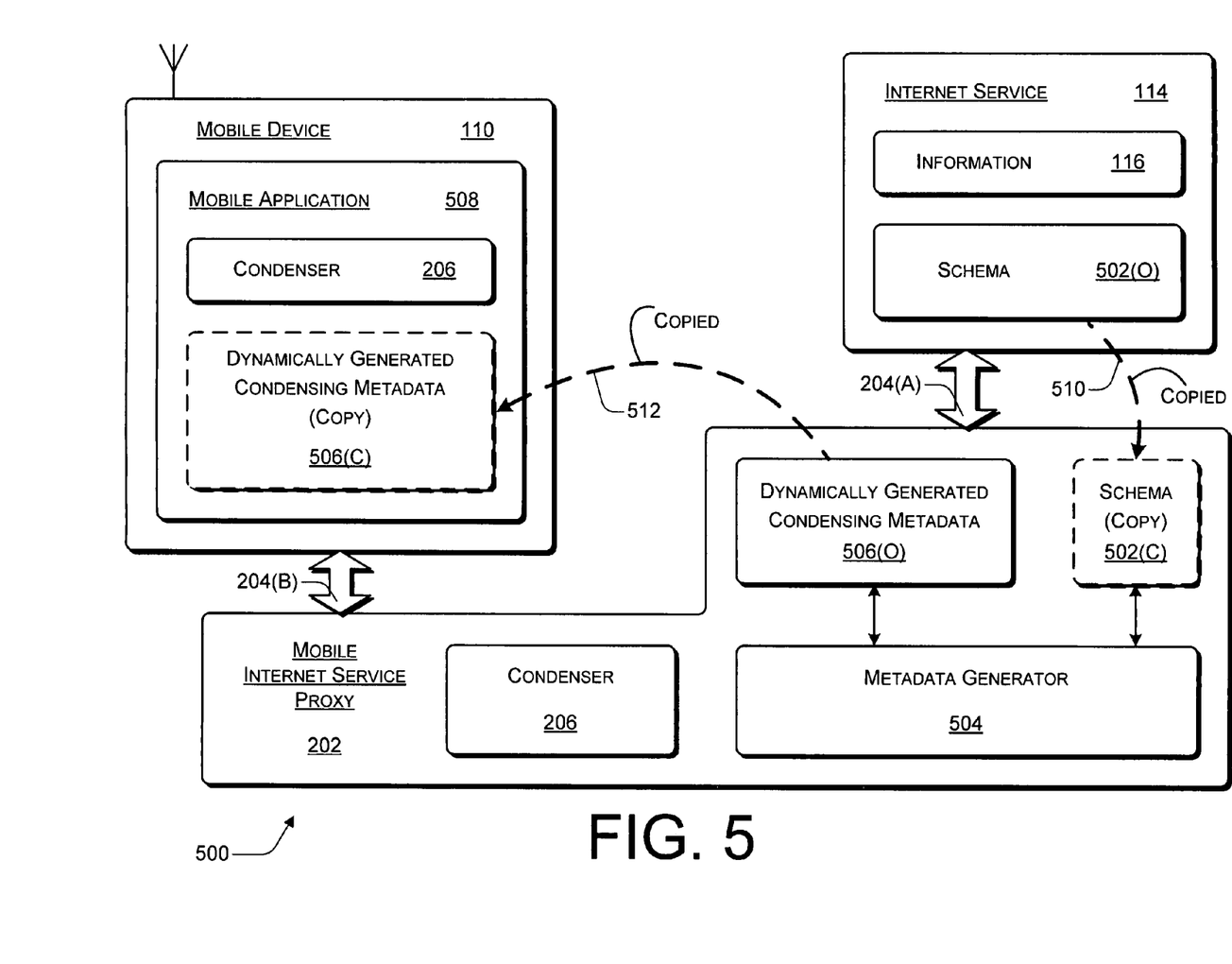
FIG. 5 is a block diagram illustrating an example mechanism for installation of dynamically-generated condensing metadata.

Example Dynamic Generation Implementations for Dynamic Utilization of Condensing Metadata FIG. 5 is a block diagram illustrating an example mechanism 500 for installation of dynamically-generated condensing metadata. Example mechanism 500 includes a mobile device 110, an internet service 114, and a mobile internet service proxy 202. In mechanism 500, internet service 114 does not include any intrinsic condensing abilities in order to reduce the bandwidth consumed by mobile internet services. Consequently, mobile internet service proxy 202 is shunted between mobile device 110 and internet service 114 to facilitate the condensation of communications flowing there between.

Mobile device 110 includes a mobile application 508, and mobile application 508 includes a condenser 206. Although the reference numerals differ for the mobile applications of FIGS. 2 and 5 for the sake of clarity, mobile application 120 and mobile application 508 may have essentially similar functionality. After operation of mobile internet service proxy 202 as described further herein below, mobile device 110 also includes (a copy of) dynamically-generated condensing metadata 506(C). It should be noted that condenser 206 and/or dynamically-generated condensing metadata 506 (C) may be separate from mobile application 508.

Internet service 114 includes information 116 and a schema 502. Specifically, internet service 114 includes the original of schema 502(O). Schema 502(O) describes how information 116 is organized, structured, and/or formatted. Consequently, schema 502(O) can be used to generate condensing metadata. However, internet service 114 does not include any condensing metadata (at least none that is associated with the requested information 116).

In a described implementation, mobile internet service proxy 202 includes a condenser 206 and a metadata generator 504. During operation, mobile internet service proxy 202 gains a copy of schema 502(C) and the original of dynamically-generated condensing metadata 506(O). Metadata generator 504 is adapted to accept a schema and to programmatically produce dynamically-generated condensing metadata.

Condenser 206 is capable of condensing information 116 that is received at mobile internet service proxy 202 from internet service 114 prior to its transmission to mobile device 110. Condenser 206 is also capable of uncondensing condensed information after receiving it from mobile device 110 and prior to sending it onward to internet service 114. Condensing or uncondensing by condenser 206 entails application of condensing metadata 208 to uncondensed information 116 or condensed information, respectively. In the example of mechanism 500, however, internet service 114 does not provide any condensing metadata 208. Hence, metadata generator 504 is employed to produce the original of dynamically-generated condensing metadata 506(O) based on a copy of schema 502(C).

To implement the shunting aspect of mobile internet service proxy 202 and to detour the communications between mobile device 110 and internet service 114, mobile device 110 and internet service 114 communicate with each other via mobile internet service proxy 202. Specifically, mobile device 110 and mobile internet service proxy 202 communicate over communications channel 204(B), and mobile internet service proxy 202 and internet service 114 communicate over communications channel 204(A).

Example realizations for communications channels 204(A) and 204(B) are described herein above. As another example, if mobile internet service proxy 202 is located within wireless telecommunications network 106, then communications channel 204(B) may comprise wireless communications link 112 and part of wireless telecommunications network 106. Communications channel 204(A) may thus comprise part of wireless telecommunications network 106, gateway 122, and internet 108. Regardless, mobile internet service proxy 202 is located such that it may engage in condensed communications with mobile device 110 and engage in corresponding uncondensed versions of such communications with internet service 114.

In an example operation of mechanism 500, mobile internet service proxy 202 acquires proxy responsibility for mobile device 110. When mobile device 110 attempts to communicate with internet service 114 in the context of information 116, mobile internet service proxy 202 determines that internet service 114 lacks condensing metadata 208 that is associated with information 116.

Consequently, mobile internet service proxy 202 attains a copy of schema 502(C) over communications channel 204(A) as indicated by copy arrow 510. Metadata generator 504 generates the original of dynamically-generated condensing metadata 506(O) based on schema 502(C). Dynamically-generated condensing metadata 506 may be produced programmatically by metadata generator 504.

A copy of dynamically-generated condensing metadata 506(C) is provided to mobile device 110 over communications channel 204(B) as indicated by copy arrow 512. If mobile application 508 lacks the capability, mobile internet service proxy 202 can also provide condenser 206 to mobile device 110. Condenser 206 of mobile application 508 is then empowered to uncondense the condensed information that is received from mobile internet service proxy 202 using dynamically-generated condensing metadata 506(C). Condenser 206 is also capable of condensing information, which is to be sent to mobile internet service proxy 202, responsive to dynamically-generated condensing metadata 506(C).

As described above with particular reference to FIG. 2, condenser 206 of mobile device 110 and internet service 114 may be versioned. Likewise, condenser 206 of mobile internet service proxy 202 may be versioned. Moreover, dynamically-generated condensing metadata 506 (and condensing metadata 208 of FIG. 2) may also be versioned. This enables mobile device 110, internet service 114, and mobile internet service proxy 202 to cache condensing metadata 208 and 506 for future usage.

The versioning allows mobile device 110, internet service 114, and mobile internet service proxy 202 to remain synchronized with internet service capabilities and subsequently-developed schemas 502, as well as the condensing metadata used to support condensing and uncondensing. For example, if mobile device 110 detects that a version of dynamically-generated condensing metadata 506(C) fails to match a version of schema 502(O), mobile device 110 may ask mobile internet service proxy 202 to generate new dynamically-generated condensing metadata 506(O) after requesting a copy of new schema 502(O). Alternatively, mobile internet service proxy 202 may make such a detection, request the new schema 502(O), and forward new dynamically-generated condensing metadata 506 to mobile device 110 without receiving instructions from mobile device 110.

Hence, condensed communications between mobile device 110 and mobile internet service proxy 202 are enabled in which mobile internet service proxy 202 acts an intermediary. As a communications intermediary, mobile internet service proxy 202 can enable bandwidth-reducing condensed communications, at least during the wireless communications link 112 portion of the communication path, between mobile device 110 and internet service 114 even when internet service 114 lacks intrinsic condensing capabilities.

Figure 6:
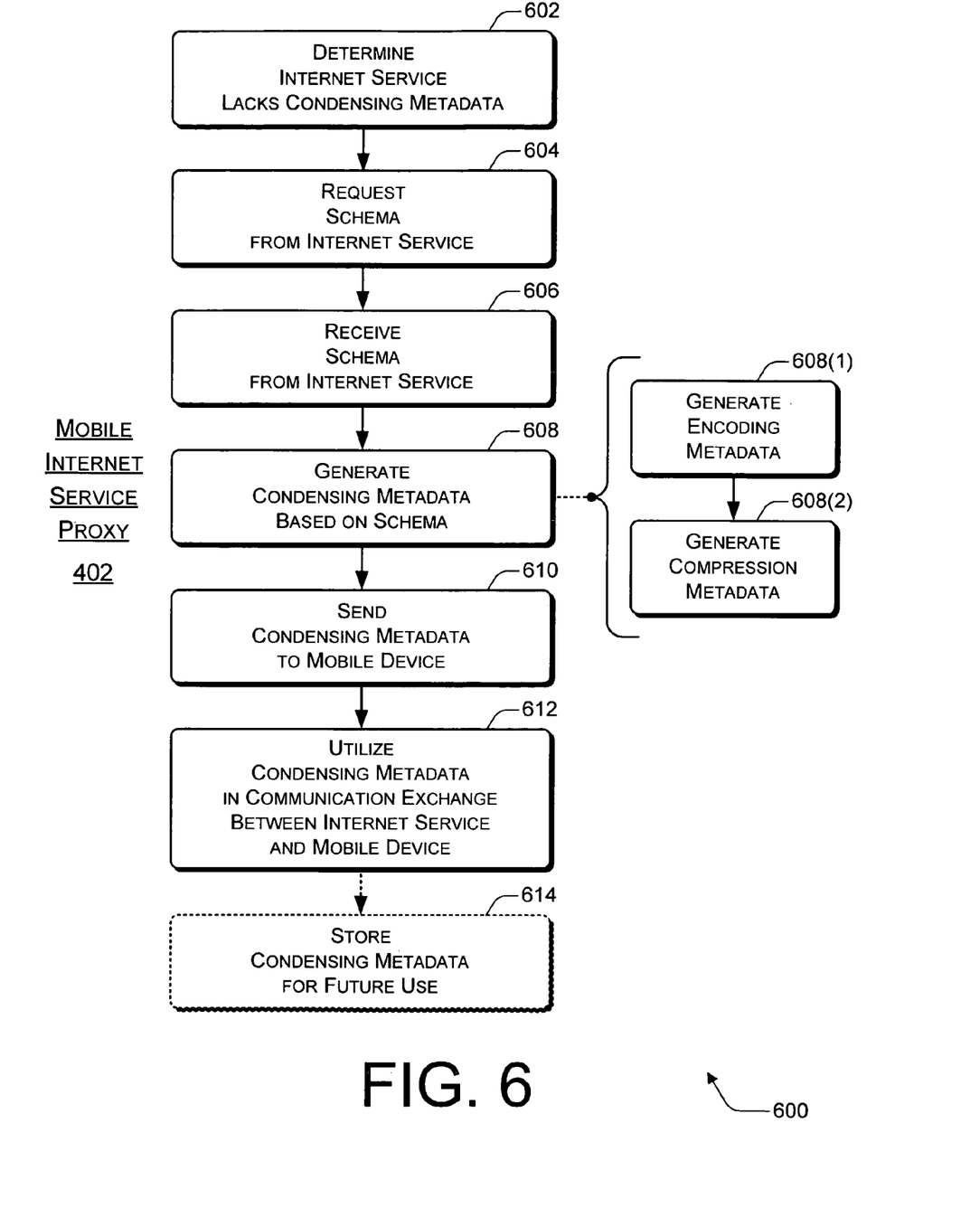
FIG. 6 is a flow diagram that illustrates an example of a method for installing dynamically-generated condensing metadata.

FIG. 6 is a flow diagram 600 that illustrates an example of a method for installing dynamically-generated condensing metadata. Flow diagram 600 includes seven (7) "primary" blocks 602-614 and two (2) "secondary" blocks 608(1), and 608(2). Although the actions of flow diagram 600 may be performed in other environments and with a variety of hardware and software combinations, FIGS. 1 and 5 are used in particular to illustrate certain aspects and examples of the method. By way of example only, the actions of flow diagram 600 may be performed by a mobile internet service proxy 202.

Mobile internet service proxy 202 has acquired proxy responsibility for a mobile device 110. Mobile internet service proxy 202 detects that the protocol being used by internet service 114 is not compressed. It indicates to mobile application 508 that it can dynamically condense the protocol. Mobile application 508 may then opt to condense the protocol and indicate to mobile internet service proxy 202 that it should dynamically condense the protocol.

At block 602, it is determined (or verified) that the internet service lacks condensing metadata. For example, after an inquiry or by consulting a stored table, mobile internet service proxy 202 may determine that internet service 114 lacks condensing metadata 208, at least with respect to associated information 116 that is identified by a mobile device 110 in an internet service access request.

At block 604, a schema for the identified information is requested from the internet service. For example, mobile internet service proxy 202 may request from internet service 114 over communications channel 204(A) a copy of schema 502 that is associated with the identified information 116. At block 606, the schema is received from the internet service. For example, mobile internet service proxy 202 may receive a copy of schema 502(C) from internet service 114 over communications channel 204(A).

At block 608, condensing metadata is dynamically generated based on the schema. For example, metadata generator 504 of mobile internet service proxy 202 may produce the original of dynamically-generated condensing metadata 506

(O) based on schema 502(C). Blocks 608(1) and 608(2) illustrate actions for an example implementation of the action(s) of block 608. At block 608(1), encoding metadata is generated. At block 608(2), compression metadata is generated. For instance, encoding metadata and compression metadata (e.g., encoding metadata 210 and compression metadata 212 as shown in FIG. 2) may be generated based on schema 502(C) by metadata generator 504.

At block 610, the dynamically-generated condensing metadata is sent to the mobile device. For example, a copy of dynamically-generated condensing metadata 506(O) may be transmitted over communications channel 204(B) to mobile device 110. (At mobile device 110, the copy of dynamically-generated condensing metadata 506(C) may be loaded for use by mobile application 508.)

At block 612, the condensing metadata is utilized in a communication exchange between the internet service and the mobile device. For example, the dynamically-generated condensing metadata 506(C) and 506(O) may be utilized in a communication exchange between internet service 114 and mobile device 110. For instance, mobile internet service proxy 202 may act as an intermediary between mobile device 110 and internet service 114 such that those communications traveling the portion of the communication path between mobile device 110 and internet service 114 that extends between mobile device 110 and mobile internet service proxy 202 can be condensed.

Accordingly, unidirectional or bidirectional communications between mobile device 110 and internet service 114, to the point along their communication path at which mobile internet service proxy 202 is shunted, may be condensed to reduce the bandwidth consumed by the communications. An example of a condensing operation between a mobile device 110 and a mobile internet service proxy 202, for communications between mobile device 110 and an internet service 114, is described further herein below with particular reference to FIG. 7.

At block 614, the dynamically-generated condensing metadata is optionally stored for future use. For example, mobile internet service proxy 202 may elect to store for future use dynamically-generated condensing metadata 506(O) in association with internet service 114, mobile device 110, and/or the related information 116. If mobile device 110 or another mobile device subsequently requests information 116 from internet service 114, mobile internet service proxy 202 may condense information 116 without having to dynamically regenerate the condensing metadata 506(O) or re-retrieve schema 502. Alternatively, mobile internet service proxy 202 may store schema 502 so that dynamically-generated condensing metadata 506 may be re-produced without repeating the retrieval. Versioning of condenser 206, condensing metadata 208 and 506, and/or schema 502 can facilitate this caching and subsequent reuse of metadata 208/506 and/or schema 502(C).

Figure 7:
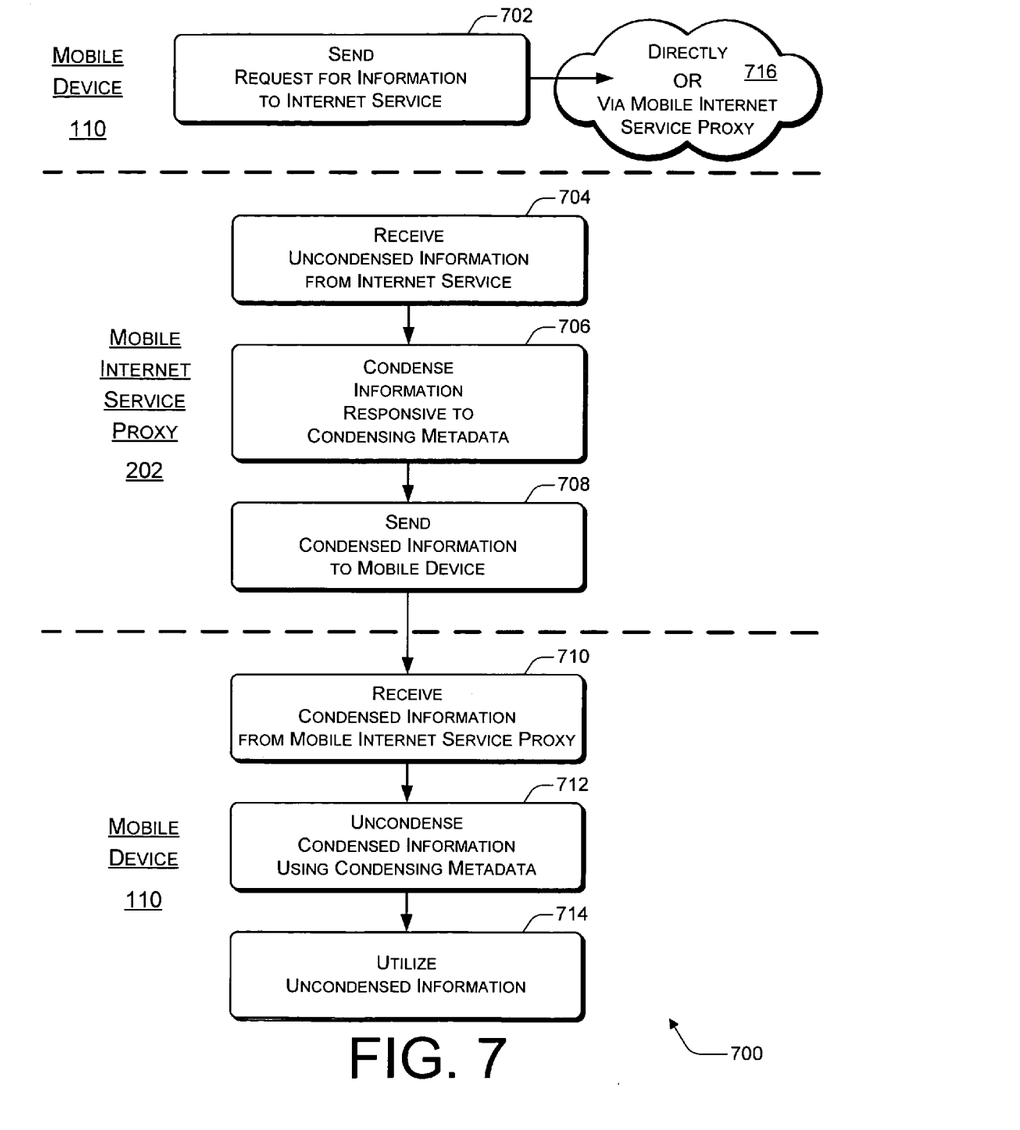
FIG. 7 is a flow diagram that illustrates another example of a method for bandwidth reduction by communicating condensed information.

FIG. 7 is a flow diagram 700 that illustrates another example of a method for bandwidth reduction by communicating condensed information. Flow diagram 700 includes seven (7) blocks 702-714. Although the actions of flow diagram 700 may be performed in other environments and with a variety of hardware and software combinations, FIGS. 1 and 5 are used in particular to illustrate certain aspects and examples of the method. By way of example only, the actions of blocks 702 and 710-714 may be performed by a mobile device 110 having a copy of dynamically-generated condensing metadata 506(C), and the actions of blocks 704-708 may be performed by a mobile internet service proxy 202 having the original dynamically-generated condensing metadata 506 (O).

At block 702, a request for information is sent to an internet service. For example, mobile application 508 of mobile device 110 may send a request for information 116 to internet service 114. As indicated by cloud 716, the request may be sent from mobile device 110 to internet service 114 directly or by way of mobile internet service proxy 202.

At block 704, the requested information in an uncondensed form is received from the internet service at the mobile internet service proxy. For example, mobile internet service proxy 202 may receive information 116 in an uncondensed form from internet service 114 via communications channel 204 (A).

At block 706, the received information is condensed responsive to condensing metadata to produce condensed information. For example, condenser 206 of mobile internet service proxy 202 may condense information 116 responsive to dynamically-generated condensing metadata 506(O) to produce a condensed version of information 116.

At block 708, the condensed information is sent to the mobile device. For example, mobile internet service proxy 202 may send the condensed version of information 116 to mobile device 110 over communications channel 204(B).

At block 710, the condensed information is received at the mobile device from the mobile internet service proxy. For example, the condensed version of information 116 may be received from mobile internet service proxy 202 at mobile device 110 via communications channel 204(B), which includes wireless communications link 112.

At block 712, the condensed information is uncondensed using condensing metadata. For example, condenser 206 of mobile application 508 may uncondense the condensed version of information 116 using dynamically-generated condensing metadata 506(C) to reproduce information 116. At block 714, the uncondensed information is utilized. For example, mobile application 508 may process, store, display, modify, some combination thereof, etc. information 116.

It should be understood that the condensing and uncondensing principles described herein above with particular reference to FIG. 3 (e.g., with regard to communications between a mobile device 110 and an internet service 114 that each have condensing metadata 208) are applicable to communications between a mobile device 110 and a mobile internet service proxy 202 that function with dynamically-generated condensing metadata 506.

Additionally, the actions of FIG. 7 are described in the context of a request for information and a receipt of the requested information as partially indicated by block 702. However, the information condensing with condensing metadata implementations that are described herein are also applicable in other context/scenarios along with the communication flows thereof. By way of example only, push/pull scenarios may be supported. For instance, a mobile device 110 may first receive condensed information from an internet service 114, possibly by way of a mobile internet service proxy 202. Afterwards, mobile device 110 may asynchronously request condensing metadata 208/506 and optionally a condenser 206 that are to be used to make the condensed information accessible by uncondensing it.

The devices, actions, aspects, features, functions, procedures, modules, data structures, components, etc. of FIGS. 1-7 are illustrated in diagrams that are divided into multiple blocks. However, the order, interconnections, interrelationships, layout, etc. in which FIGS. 1-7 are described and/or shown is not intended to be construed as a limitation, and any number of the blocks can be modified, combined, rearranged, augmented, omitted, etc. in any manner to implement one or more systems, methods, devices, procedures, media, apparatuses, APIs, arrangements, etc. for dynamic utilization of condensing metadata. Furthermore, although the description herein includes references to specific implementations (including a general device of FIG. 8), the illustrated and/or described implementations can be implemented in any suitable hardware, software, firmware, or combination thereof and using any information organization(s), schema format(s), condensing algorithm(s), network type(s), communication protocol(s), and/or metadata generation approach(es), and so forth.

Example Operating Environment for Computer or Other Device

Figure 8:
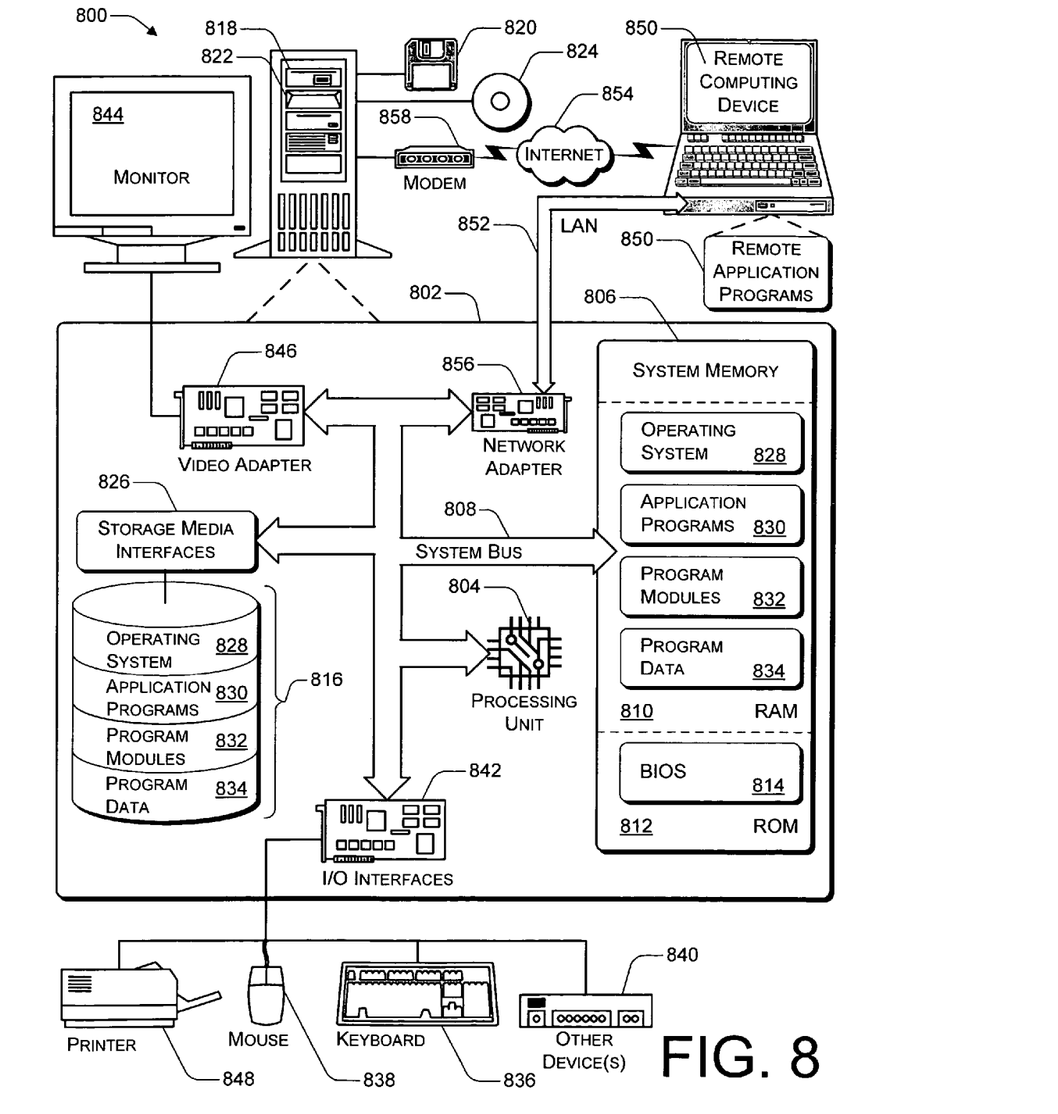
FIG. 8 illustrates an example of a computing (or general device) operating environment that is capable of (wholly or partially) implementing at least one aspect of dynamic utilization of condensing metadata as described herein.

FIG. 8 illustrates an example computing (or general device) operating environment 800 that is capable of (fully or partially) implementing at least one system, device, apparatus, component, arrangement, protocol, approach, method, procedure, media, application programming interface (API), some combination thereof, etc. for dynamic utilization of condensing metadata as described herein. Operating environment 800 may be utilized in the computer and network architectures described below.

Example operating environment 800 is only one example of an environment and is not intended to suggest any limitation as to the scope of use or functionality of the applicable device (including computer, network node, entertainment device, mobile appliance, general electronic device, etc.) architectures. Neither should operating environment 800 (or the devices thereof) be interpreted as having any dependency or requirement relating to any one or to any combination of components as illustrated in FIG. 8.

Additionally, implementations for dynamic utilization of condensing metadata may be realized with numerous other general purpose or special purpose device (including computing system) environments or configurations. Examples of well known devices, systems, environments, and/or configurations that may be suitable for use include, but are not limited to, personal computers, server computers, thin clients, thick clients, personal digital assistants (PDAs) or mobile telephones, watches, hand-held or laptop devices, multiprocessor systems, microprocessor-based systems, set-top boxes, programmable consumer electronics, video game machines, game consoles, portable or handheld gaming units, network PCs, videoconferencing equipment, minicomputers, mainframe computers, network nodes, distributed or multi-processing computing environments that include any of the above systems or devices, some combination thereof, and so forth.

Implementations for dynamic utilization of condensing metadata may be described in the general context of processor-executable instructions. Generally, processor-executable instructions include routines, programs, protocols, objects, functions, interfaces, components, data structures, etc. that perform and/or enable particular tasks and/or implement particular abstract data types. Realizations for dynamic utilization of condensing metadata, as described in certain implementations herein, may also be practiced in distributed processing environments where tasks are performed by remotely-linked processing devices that are connected through a communications link and/or network. Especially but not exclusively in a distributed computing environment, processor-executable instructions may be located in separate storage media, executed by different processors, and/or propagated over transmission media.

Example operating environment 800 includes a general-purpose computing device in the form of a computer 802, which may comprise any (e.g., electronic) device with computing/processing capabilities. The components of computer 802 may include, but are not limited to, one or more processors or processing units 804, a system memory 806, and a system bus 808 that couples various system components including processor 804 to system memory 806.

Processors 804 are not limited by the materials from which they are formed or the processing mechanisms employed therein. For example, processors 804 may be comprised of semiconductor(s) and/or transistors (e.g., electronic integrated circuits (ICs)). In such a context, processor-executable instructions may be electronically-executable instructions. Alternatively, the mechanisms of or for processors 804, and thus of or for computer 802, may include, but are not limited to, quantum computing, optical computing, mechanical computing (e.g., using nanotechnology), and so forth.

System bus 808 represents one or more of any of many types of wired or wireless bus structures, including a memory bus or memory controller, a point-to-point connection, a switching fabric, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, some combination thereof, and so forth.

Computer 802 typically includes a variety of processor-accessible media. Such media may be any available media that is accessible by computer 802 or another (e.g., electronic) device, and it includes both volatile and non-volatile media, removable and non-removable media, and storage and transmission media.

System memory 806 includes processor-accessible storage media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is typically stored in ROM 812. RAM 810 typically contains data and/or program modules/instructions that are immediately accessible to and/or being presently operated on by processing unit 804.

Computer 802 may also include other removable/non-removable and/or volatile/non-volatile storage media. By way of example, FIG. 8 illustrates a hard disk drive or disk drive array 816 for reading from and writing to a (typically) non-removable, non-volatile magnetic media (not separately shown); a magnetic disk drive 818 for reading from and writing to a (typically) removable, non-volatile magnetic disk 820 (e.g., a "floppy disk"); and an optical disk drive 822 for reading from and/or writing to a (typically) removable, non-volatile optical disk 824 such as a CD, DVD, or other optical media. Hard disk drive 816, magnetic disk drive 818, and optical disk drive 822 are each connected to system bus 808 by one or more storage media interfaces 826. Alternatively, hard disk drive 816, magnetic disk drive 818, and optical disk drive 822 may be connected to system bus 808 by one or more other separate or combined interfaces (not shown).

The disk drives and their associated processor-accessible media provide non-volatile storage of processor-executable instructions, such as data structures, program modules, and other data for computer 802. Although example computer 802 illustrates a hard disk 816, a removable magnetic disk 820, and a removable optical disk 824, it is to be appreciated that other types of processor-accessible media may store instructions that are accessible by a device, such as magnetic cassettes or other magnetic storage devices, flash memory, compact disks (CDs), digital versatile disks (DVDs) or other optical storage, RAM, ROM, electrically-erasable programmable read-only memories (EEPROM), and so forth. Such media may also include so-called special purpose or hard-wired IC chips. In other words, any processor-accessible media may be utilized to realize the storage media of the example operating environment 800.

Any number of program modules (or other units or sets of processor-executable instructions) may be stored on hard disk 816, magnetic disk 820, optical disk 824, ROM 812, and/or RAM 810, including by way of general example, an operating system 828, one or more application programs 830, other program modules 832, and program data 834. These processor-executable instructions may include, for example, one or more of: a mobile application 120/508, a condenser 206, information 116, schema 502, condensing metadata 208/506, metadata generator 504, mobile internet service proxy 202, condensing metadata provider 214, some combination thereof, and so forth.

A user may enter commands and/or information into computer 802, via input devices such as a keyboard 836 and a pointing device 838 (e.g., a "mouse"). Other input devices 840 (not shown specifically) may include a microphone, joystick, game pad, satellite dish, serial port, video camera, scanner, and/or the like. These and other input devices are connected to processing unit 804 via input/output interfaces 842 that are coupled to system bus 808. However, input devices and/or output devices may instead be connected by other interface and bus structures, such as a parallel port, a game port, a universal serial bus (USB) port, an infrared port, an IEEE 1394 ("Firewire") interface, an IEEE 802.11 wireless interface, a Bluetooth® wireless interface, and so forth.

A monitor/view screen 844 or other type of display device may also be connected to system bus 808 via an interface, such as a video adapter 846. Video adapter 846 (or another component) may be or may include a graphics card for processing graphics-intensive calculations and for handling demanding display requirements. Typically, a graphics card includes a graphics processing unit (GPU), video RAM (VRAM), etc. to facilitate the expeditious display of graphics and performance of graphics operations. In addition to monitor 844, other output peripheral devices may include components such as speakers (not shown) and a printer 848, which may be connected to computer 802 via input/output interfaces 842.

Computer 802 may operate in a networked environment using logical connections to one or more remote computers, such as a remote computing device 850. By way of example, remote computing device 850 may be a peripheral device, a personal computer, a portable computer (e.g., laptop computer, tablet computer, PDA, mobile station, etc.), a palm or pocket-sized computer, a watch, a gaming device, a server, a router, a network computer, a peer device, another network node, or another device type as listed above, and so forth. However, remote computing device 850 is illustrated as a portable computer that may include many or all of the elements and features described herein with respect to computer 802.

Logical connections between computer 802 and remote computer 850 are depicted as a local area network (LAN) 852 and a general wide area network (WAN) 854. Such networking environments are commonplace in offices, enterprise-wide computer networks, intranets, the Internet, fixed and mobile telephone networks, ad-hoc and infrastructure wireless networks, mesh networks, other wireless networks, gaming networks, some combination thereof, and so forth. Such networks and logical and physical communications connections are additional examples of transmission media.

When implemented in a LAN networking environment, computer 802 is usually connected to LAN 852 via a network interface or adapter 856. When implemented in a WAN networking environment, computer 802 typically includes a modem 858 or other component for establishing communications over WAN 854. Modem 858, which may be internal or external to computer 802, may be connected to system bus 808 via input/output interfaces 842 or any other appropriate mechanism(s). It is to be appreciated that the illustrated network connections are examples and that other manners for establishing communication link(s) between computers 802 and 850 may be employed.

In a networked environment, such as that illustrated with operating environment 800, program modules or other instructions that are depicted relative to computer 802, or portions thereof, may be fully or partially stored in a remote media storage device. By way of example, remote application programs 860 reside on a memory component of remote computer 850 but may be usable or otherwise accessible via computer 802. Also, for purposes of illustration, application programs 830 and other processor-executable instructions such as operating system 828 are illustrated herein as discrete blocks, but it is recognized that such programs, components, and other instructions reside at various times in different storage components of computing device 802 (and/or remote computing device 850) and are executed by processor(s) 804 of computer 802 (and/or those of remote computing device 850).

Although systems, media, devices, methods, procedures, apparatuses, techniques, schemes, approaches, procedures, arrangements, and other implementations have been described in language specific to structural, logical, algorithmic, and functional features and/or diagrams, it is to be understood that the invention defined in the appended claims is not necessarily limited to the specific features or diagrams described. Rather, the specific features and diagrams are disclosed as exemplary forms of implementing the claimed invention.

What is claimed is:

1. A method for a mobile internet service proxy, the method comprising:
   receiving, from a mobile device, a request for information from an internet service;
   determining whether the internet service includes condensing metadata that is used to condense and uncondense information communicated between the internet service and the mobile device;
   based at least partly on a determination that that the internet service does not include the condensing metadata, inquiring whether the mobile device wants the mobile internet service proxy to dynamically compress the requested information;
   responsive to a request by the mobile device to dynamically compress the requested information, requesting a schema from the internet service;
   based on the schema, generating condensing metadata that includes encoding metadata and compression metadata;
   sending the condensing metadata to the mobile device, the condensing metadata being used to condense and uncondense the information exchanged between the internet service and the mobile device by encoding extensible markup language tags of the information responsive to the encoding metadata and compressing attribute data associated with the information responsive to the compression metadata; and based at least partly on a determination that a version of the condensing metadata does not match a version of the schema, requesting a new schema, generating new condensing metadata, and providing the new condensing metadata to the mobile device, the mobile device, the internet service, and the mobile internet service proxy each being versioned such that the mobile device, the internet service, and the mobile internet service proxy are synchronized with the condensing metadata, internet service capabilities, and subsequently developed schemas.

2. The method as recited in claim 1, further comprising:
condensing the communication exchange along a portion of an overall communications path having endpoints of the internet service and the mobile device, the portion of the overall communications path extending between the mobile device and the mobile internet service proxy.

3. The method as recited in claim 1, further comprising:
storing the condensing metadata in association with at least the internet service to enable reuse of the condensing metadata.

4. The method as recited in claim 1, further comprising:
receiving the requested information in an uncondensed format from the internet service;
condensing the requested information responsive to the condensing metadata to produce requested information in a condensed format; and
sending the requested information in the condensed format to the mobile device.

5. The method as recited in claim 1, further comprising:
receiving outgoing mobile information in a condensed format from the mobile device;
uncondensing the outgoing mobile information using the condensing metadata to produce the outgoing mobile information in an uncondensed format; and
sending the outgoing mobile information in the uncondensed format to the internet service.

6. The method as recited in claim 1, wherein the generating comprises:
programmatically generating the condensing metadata, the condensing metadata comprising a data structure comporting with an extensible markup language such that the mobile device can access the internet service through the mobile internet service proxy using a dynamically condensed internet service protocol.

7. The method as recited in claim 1, wherein the mobile internet service proxy is located at a telecommunications-related node within a wireless telecommunications network, at an internet-related node within an internet network, and/or at a gateway node.

8. The method as recited in claim 1, wherein the schema is of a first version; and further comprising:
receiving a second schema of a second version from the internet service;
generating second condensing metadata based on the second schema, the second condensing metadata being of a second version; and
sending the second condensing metadata to the mobile device.

9. A method for a mobile device, the method comprising:
requesting information from an internet service;
based on a determination by a mobile internet proxy server that the internet service does not use a compression protocol, receiving an indication that the mobile internet proxy server is configured to dynamically condense the requested information;
in response to the indication, requesting that the mobile internet service proxy dynamically condense the requested information;
receiving the requested information in a condensed format from a mobile internet service proxy, the requested information originating from an internet service in an uncondensed format;
uncondensing the requested information using condensing metadata, that includes encoding metadata and compression metadata, to reproduce the requested information in the uncondensed format by encoding extensible markup language tags of the requested information that are responsive to the encoding metadata included in the condensing metadata;
utilizing the information in the uncondensed format;
storing the condensing metadata to condense and uncondense other information requested from the internet service at a later time by compressing attribute data associated with the other information responsive to the compression metadata included in the condensing metadata; and
based at least partly on a determination that a version of the condensing metadata does not match a version of a schema, receiving new condensing metadata, the mobile device, the internet service, and the mobile internet service proxy each being versioned such that the mobile device, the internet service, and the mobile internet service proxy are synchronized with internet service capabilities and subsequently developed schemas.

10. The method as recited in claim 9, further comprising:
condensing the other information responsive to the condensing metadata to produce the other information in a condensed format; and
sending the other information in the condensed format to the mobile internet service proxy for uncondensing and subsequent forwarding to the internet service.

11. The method as recited in claim 10, further comprising:
receiving the condensing metadata from the mobile internet service proxy, the condensing metadata dynamically generated by the mobile internet service proxy based on a schema associated with the requested information.

12. The method as recited in claim 9, wherein the condensing metadata comprises the encoding metadata and the compression metadata; and wherein the uncondensing comprises:
decoding tag-related information using the encoding metadata; and
decompressing attribute-data-related information using the compression metadata.

13. A method for a mobile internet service proxy, the method comprising:
receiving a request for information from an internet service;
determining whether the internet service includes condensing metadata that is used to condense and uncondense information communicated between the internet service and a mobile device;
based at least partly on a determination that that the internet service does not include the condensing metadata, requesting a schema from the internet service;

responsive to the requesting of the schema, generating the condensing metadata based on the schema, the condensing metadata including encoding metadata and compression metadata;

based at least partly on a determination that the internet service includes the condensing metadata, determining whether the mobile device lacks the condensing metadata; and based at least partly on a determination that the mobile device lacks the condensing metadata, providing the condensing metadata to the mobile device, the mobile internet service proxy being located separately from the internet service and the mobile device, and the condensing metadata being used to condense and uncondense information exchanged between the internet service and the mobile device by encoding extensible markup language tags of the information responsive to the encoding metadata and compressing attribute data associated with the information responsive to the compression metadata; and based at least partly on a determination that a version of the condensing metadata does not match a version of the schema, requesting a new schema, generating new condensing metadata, and providing the new condensing metadata to the mobile device, the mobile device, the internet service, and the mobile internet service proxy each being versioned such that the mobile device, the internet service, and the mobile internet service proxy are synchronized with the condensing metadata, internet service capabilities, and subsequently developed schemas.

14. The method as recited in claim 13, further comprising:
detecting a communication attempt by the mobile device with the internet service, the communication attempt related to requested information possessed by the internet service; and
interrogating the internet service with respect to having condensing metadata that is associated with the requested information.

15. The method as recited in claim 13, wherein the providing comprises:
based at least partly on the determination that that the internet service includes the condensing metadata, retrieving the condensing metadata from the internet service and forwarding the condensing metadata to the mobile device; or
based at least partly on the determination that that the internet service includes the condensing metadata, instructing the internet service to send the condensing metadata to the mobile device.

16. The method as recited in claim 13, wherein the providing comprises:
causing the mobile device to load the condensing metadata so as to be operable with a mobile application, the mobile application thereafter capable of engaging in condensed communications with the internet service by utilizing the condensing metadata.

17. The method as recited in claim 13, wherein the determining whether the internet service includes condensing metadata and the determining that the mobile device lacks the condensing metadata each comprise:
querying the internet service and/or the mobile device with respect to condensing metadata; or
detecting at least one uncondensed communication exchanged between the mobile device and the internet service.

18. The method as recited in claim 13, further comprising:
requesting the schema from another internet service;
generating the condensing metadata based on the schema; and
sending the generated condensing metadata to the mobile device to enable condensed communications to be transmitted between the mobile device and the mobile internet service proxy for communication exchanges between the mobile device and the other internet service.

* * * * *